Oct. 19, 1948. W. E. JOHNSON 2,451,835
SUPERCHARGER CONTROL SYSTEM
Filed Jan. 28, 1942 3 Sheets-Sheet 3
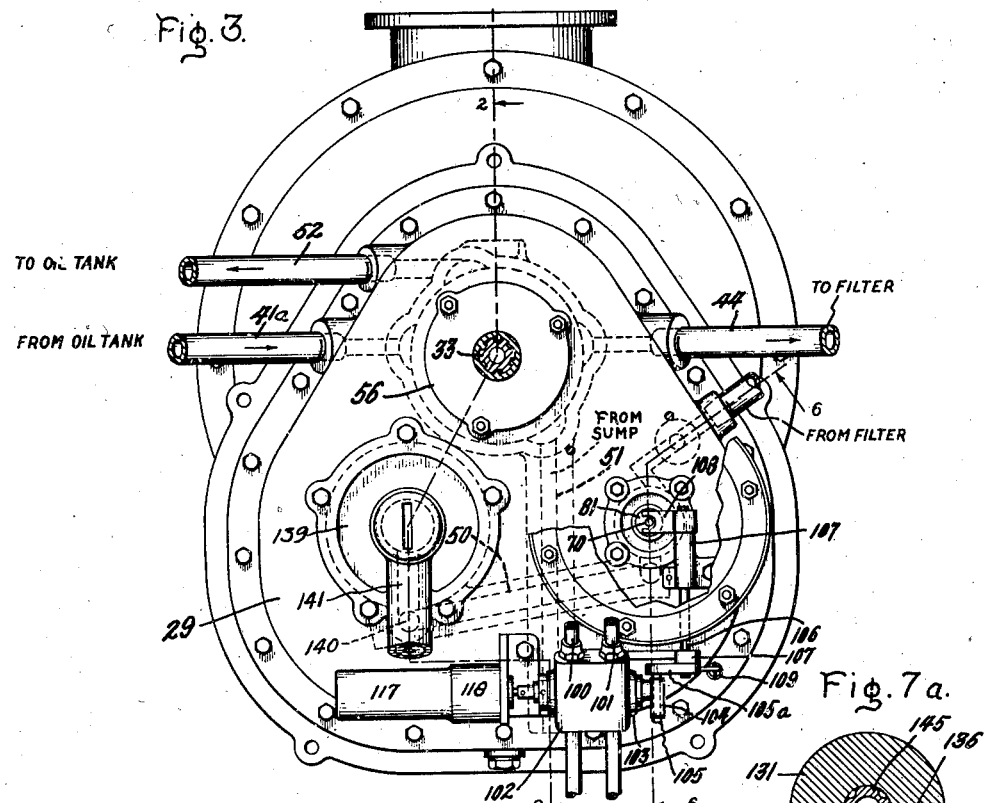
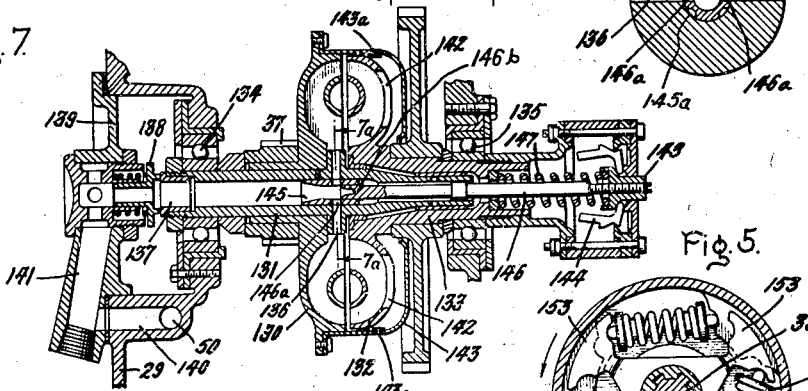
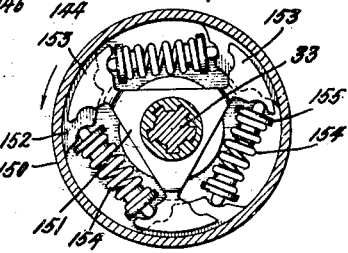
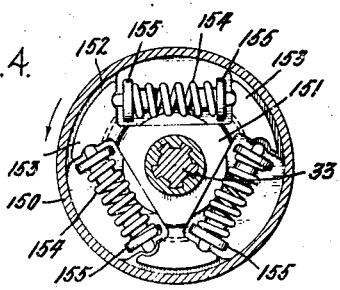
Inventor:
Wilfrid E. Johnson,
by Harry E. Dunham
His Attorney.

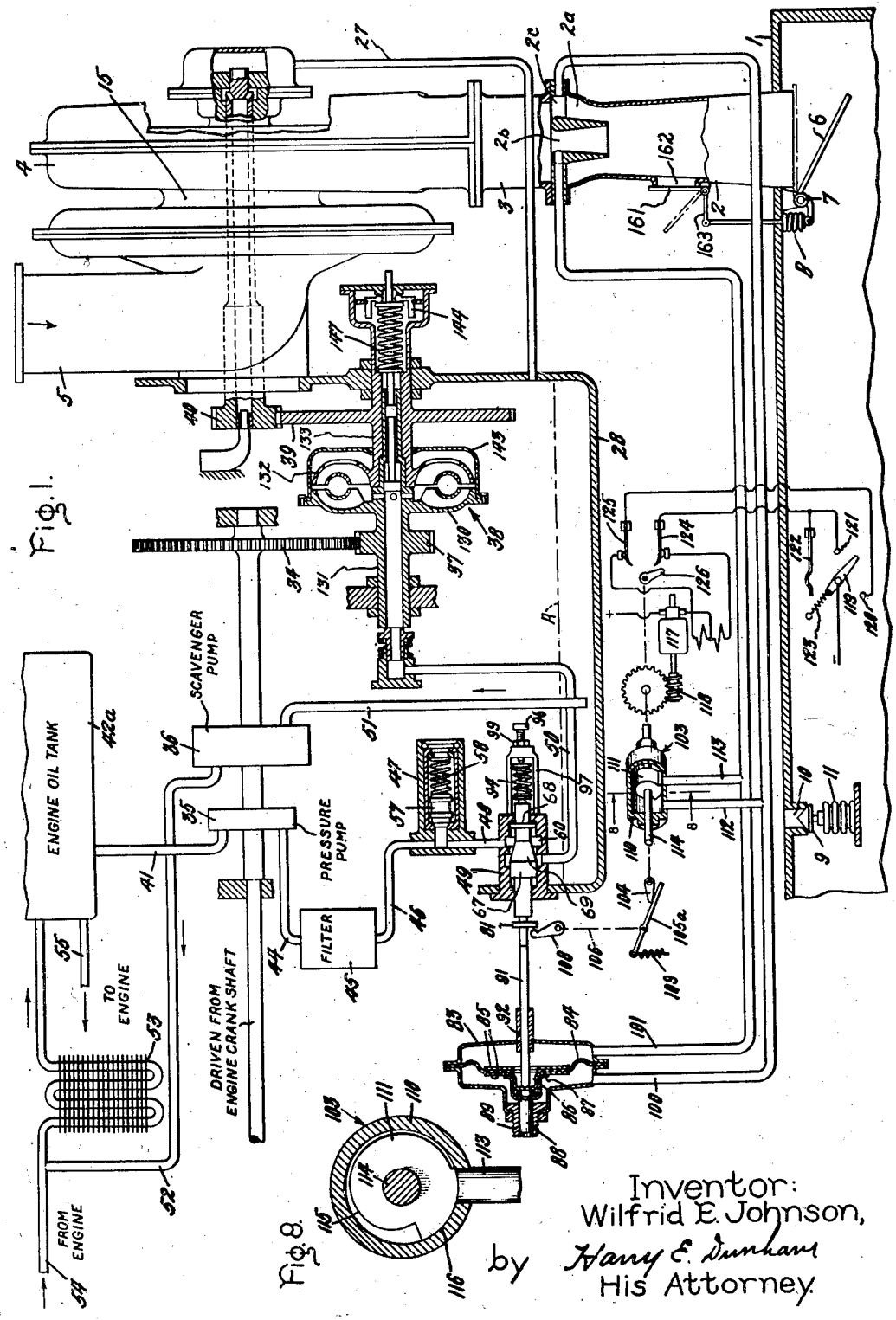

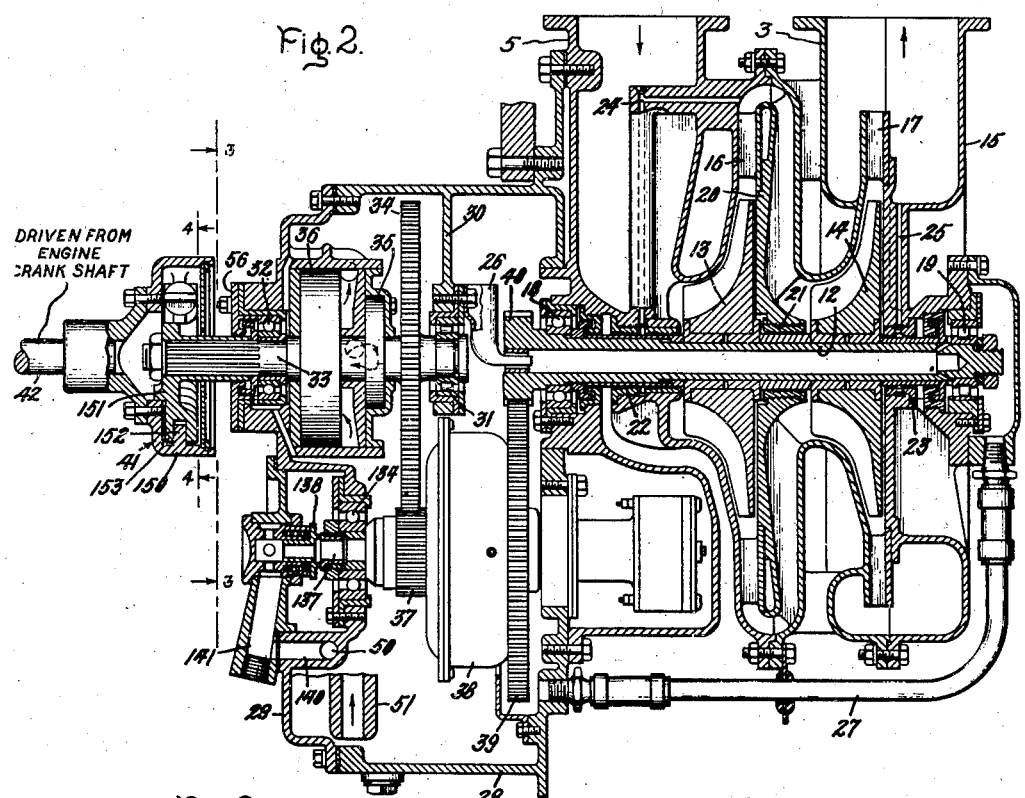

Patented Oct. 19, 1948

2,451,835

UNITED STATES PATENT OFFICE 2,451,835

SUPERCHARGER CONTROL SYSTEM

Wilfrid E. Johnson, Marblehead, Mass., assignor to General Electric Company, a corporation of New York Application January 28, 1942, Serial No. 428,570

23 Claims. (Cl. 98—1.5)

In connection with aircraft for operation at high altitudes, for example altitudes of the order of 8,000 feet and higher, it is known to provide a supercharger for supplying air to the cabin of the aircraft to maintain in the cabin a pressure of a desired value.

My invention relates to the operation and control of such superchargers and has for its object to provide an improved supercharger control system.

For a consideration of what I believe to be novel and my invention, attention is directed to the following specification and the claims appended thereto.

In the drawing, Fig. 1 is a diagrammatic view of a system embodying my invention; Fig. 2 is a sectional view of a centrifugal compressor and associated drive and control mechanisms, the section being taken on line 2—2, Fig. 3; Fig. 3 is a front view, with parts broken away, of the construction shown in Fig. 2, the line 3—3 and the arrows in Fig. 2 indicating the plane and direction of the view; Fig. 4 is a detail sectional view of a spring coupling taken on line 4—4, Fig. 2; Fig. 5 is a view similar to Fig. 4 but showing the parts in different relative positions; Fig. 6 is a sectional view taken on line 6—6, Fig. 3; Fig. 7 is a sectional view through the fluid coupling and the overspeed governor associated therewith; Fig. 7a is a detail sectional view taken on line 7a—7a, Fig. 7; Fig. 8 is a sectional view taken on line 8—8, Fig. 1; and Fig. 9 is a detail view of a modification.

Fig. 1 is a diagrammatic view and shows the functional association of the structures illustrated in Figs. 2 to 8 inclusive. In Fig. 1, certain of the parts have been placed in relative positions other than those which they occupy in Figs. 2 to 8 in order to more clearly illustrate the system; also, certain parts are shown more or less diagrammatically as to structure.

Referring to the drawing, 1 indicates the cabin of an aircraft to which air is supplied through a conduit 2, one end of which opens into the cabin and the other end of which is connected to the discharge conduit 3 of a centrifugal compressor or supercharger 4, the inlet conduit of which is indicated at 5. Over the discharge end of conduit 2 is a flap valve 6 which is hinged as indicated at 7 and biased to closed position by a spring 8. This forms a safety valve which closes to prevent back flow from the cabin through conduit 2. When the supercharger 4 is running, valve 6 is held open by the flow of air through conduit 2.

The desired pressure is maintained in the cabin by a suitable adjustable automatic discharge valve. This is indicated diagrammatically as comprising valve head 9 controlling an opening 10 in the cabin wall, and having its stem connected to Sylphon bellows 11 which is subjected to cabin pressure. The cabin pressure acting on bellows 11 collapses the bellows to an extent such that valve head 9 is positioned to permit escape of air from the cabin at a rate to maintain in the cabin the desired pressure. If the pressure in the cabin decreases below the desired value, the discharge valve automatically closes to prevent further escape of air from the cabin. The automatic discharge valve and its manner of functioning form no part of my present invention. Such valves are known. Accordingly, it has been illustrated only diagrammatically. It will be understood that my invention is to be carried out in connection with an airplane cabin having an automatic discharge valve which functions in the manner indicated and which is capable of being adjusted or which adjusts itself automatically for the desired cabin pressures at various altitudes.

The compressor, in the present instance a two-stage centrifugal compressor, is shown in section in Fig. 2. It comprises a hollow shaft 12 on which are mounted the first-stage impeller 13 and the second-stage impeller 14 positioned in a compressor casing 15. The diffusers for the respective stages are indicated at 16 and 17. The shaft is carried in suitable bearings 18 and 19 mounted in the compressor casing walls. Between the two stages of the compressor is a diaphragm 20 between which and the shaft is a suitable packing 21 for preventing leakage from one stage to the other. At the points where shaft 12 passes through the casing are leakage preventing packings 22 and 23. A central portion of packing 22 is connected by a passage 24 to a point in the compressor casing on the discharge side of the first stage, and a central point of packing 23 is connected by passage 25 to a point on the discharge side of the second stage of the compressor. These passages serve to supply air to central points of the packings at pressures higher than those existing at the inner ends of such packings. This serves to prevent oil vapor or fumes from being sucked into the compressor and being discharged along with the air into the cabin. The compressor bearings are lubricated by splash lubrication. At 26 is a cup which collects lubricant and discharges it to the inside of shaft 12 through which it is conveyed to bearing 19.

From bearing 19, the lubricant drains back through a pipe 27 to the bottom of a casing 28 which is located at one end of the compressor casing, and the lower portion of which forms an oil sump. Casing 28 is formed by an annular wall, as shown in Fig. 2, the end of which is closed by a cover 29.

The details of construction of the centrifugal compressor form no part of my present invention. The construction illustrated is to be taken as typical of any suitable centrifugal compressor or supercharger.

In casing 28 is a web 30 in which is mounted a bearing 31. Carried in bearing 31 and an adjacent bearing 32 mounted in cover 29 is a shaft 33 on which is mounted a gear wheel 34, a pressure pump 35 and a scavenger pump 36. Gear wheel 34 meshes with a pinion 37 on the impeller half of a fluid coupling 38. On the runner half of fluid coupling 38 is a gear wheel 39 which meshes with a pinion 40 on compressor shaft 12. Shaft 33 is connected through a coupling 41 with a shaft 42 driven from the crank shaft of an airplane engine. Thus, it will be seen that the compressor is driven by double step-up gearing, there being a fluid coupling interposed between the two parts of the step-up gearing, i. e., between gears 34 and 37 on the one side and gears 39 and 40 on the other side. This is well shown diagrammatically in Fig. 1.

Pressure pump 35 and scavenger pump 36 may be of any suitable rotary type. The specific constructions of these pumps form no part of the present invention. They are accordingly illustrated only in outline.

Referring to Fig. 1, pressure pump 35 has its inlet side connected by a pipe 41a to a suitable source of oil supply, such as the engine oil tank indicated at 42a. The discharge side of pressure pump 35 is connected by a pipe 44 to a suitable filter 45. The outlet side of filter 45 is connected by a pipe 46 to a pressure relief valve 47 which in turn is connected by a conduit 48 to the inlet side of a regulating valve 49. The outlet side of regulating valve 49 is connected by a pipe 50 to fluid coupling 38. Thus, the pressure pump serves to supply oil under pressure from tank 42 to the fluid coupling, the supply being under control of relief valve 47 and regulating valve 49. The scavenger pump has its inlet side connected by a pipe 51 to the lower portion of casing 28 and its discharge side connected by a pipe 52 to the engine oil tank, an oil cooler 53 being arranged in the pipe line. This pipe line may be in parallel with a pipe line 54 from the lubricating system of the engine, the pipe line leading from the oil tank to the engine being indicated at 55. The dot and dash line A indicates the approximate level of oil in the bottom of casing 28. Scavenger pump 36 serves to continuously take oil from the sump in the bottom of casing 28 and return it through the cooler to the engine oil tank 42a.

Referring now to Fig. 3, the end of shaft 33 is there shown in section, and the respective pipes 41a, 44, 51 and 52 are shown connected to the respective pumps which are indicated in dotted lines inside the casing and beyond a cap plate 56, which cap plate is shown in section in Fig. 2. The flow of oil through pressure pump 35 is indicated by dotted arrows in Fig. 2 and the flow of oil through the scavenger pump 36 is indicated by full line arrows in Fig. 2.

Referring now to Fig. 6, it will be seen that relief valve 47 and regulating valve 49, which are shown diagrammatically in Fig. 1 as being spaced apart, are built as a unitary structure, and are located inside casing 28, being supported on cover 29. The relief valve 47 comprises a suitable casing having therein a valve head 57 which is biased by a spring 58 against a seat 59. The inner end of valve head 57 is exposed to the pressure of the oil from the pressure pump. In case the pressure exceeds a predetermined value, valve head 57 is forced from its seat by such pressure to permit discharge of oil past the valve and out of the end of the valve casing into casing 28 where it finds its way to the sump at the bottom of the casing. Thus, relief valve 47 serves to maintain substantially constant the pressure of the oil supplied by pressure pump 35 to the regulating valve. The connection between relief valve 47 and regulating valve 49 which in Fig. 1 is shown diagrammatically as a pipe 48 is in the form of a conduit 48, as shown in Fig. 6. This conduit connects with the inlet chamber 60 of the regulating valve through a passage 61. From inlet chamber 60 oil flows past a valve seat 62 to an outlet chamber 63 from whence it is discharged to pipe 50 which is shown as a circle in Fig. 6 and in dotted lines in Fig. 3. The casing of regulating valve 49 is located in a flanged opening in cover plate 29, being fastened therein by a ring of bolts 64. The valve casing is provided with walls which define two spaced cylinders 65 and 66 located at opposed ends of the casing on opposite sides of valve seat 62. In the valve casing is a valve body 69 having at its two ends portions forming pistons 67 and 68 located in cylinders 65 and 66, respectively, and an intermediate portion which forms the valve body proper and which cooperates with valve seat 62 to control the flow of oil from inlet chamber 60 to outlet chamber 63. The valve body is hollow and located therein is a pilot valve 70 which serves to control flow of oil to cylinders 65 and 66. The central portion of the chamber in the valve body is enlarged to provide an oil pressure chamber 71 which surrounds valve head 72 of the pilot valve and is connected by a port 73 to inlet chamber 60. The pilot valve on each side of valve head 72 is reduced in diameter to provide annular chambers 74 and 75 which are connected by ports 76 and 77 to cylinders 65 and 66, respectively. The ends of pilot valve head 72 cooperate with the adjacent ends of pressure chamber 71 to control flow of oil through pressure chamber 71 to cylinders 65 and 66. As viewed in Fig. 6, if the pilot valve moves toward the right, the right-hand end of pilot valve head 72 moves in the bore of the valve body while the left-hand end moves away from the left-hand end of pressure chamber 71, thus connecting pressure chamber 71 through port 76 to cylinder 65, to admit oil pressure to cylinder 65 behind the piston and effect movement of the piston toward the right, the piston moving until flow of oil is again cut off by the pilot valve head. Movement of the pilot valve in the opposite direction serves to connect the pressure chamber through port 77 to cylinder 66, thus serving to effect movement of the valve body toward the left. When the pilot valve is in the position shown in Fig. 6, flow of oil from pressure chamber 71 to both cylinders 65 and 66 is cut off so that the valve body is stationary. Movement of valve body 69 is limited by pistons 67 and 68 engaging the ends of cylinders 65 and 66. Cylinder 65 is connected by a drain opening 78 to casing 28 and cylinder 66 is similarly connected to casing 28 by a drain opening 79. Drain openings 78 and 79 are relatively small in diameter compared to ports 76 and 77 so they do not prevent the building up of pressure in the respective cylinders to effect movement of the valve body; but at the same time, when the valve body is stationary, permit eventually the oil to drain out of the cylinders. This is desirable in order that the valve body may respond promptly to the building up of oil pressure in one or the other of the cylinders. The valve body is provided with extensions 80 which project through the respective heads of the valve casing and serve to guide movement of the valve body. These extensions 80 are hollow and extending out through them are extensions of the pilot valve. On the left-hand extension of the pilot valve (Figs. 1, 3 and 6) is a fixed collar 81 which, as hereinafter explained, is used to effect manual closing of the regulating valve. The arrangement, including the pilot valve 70, the pistons 67 and 68, and the cylinders 65 and 66, forms a fluid actuated motor or servo-motor by means of which valve body 69 is positioned.

From another viewpoint, the regulating valve 49 comprises a casing which forms a cylindrical horizontally arranged bore with axially spaced inlet and outlet ports and a movable valve body for controlling the flow of fluid under pressure through said ports. The valve body, which is floating in the casing that is without mechanical connection to other elements, has cylindrical end portions which together with the casing form pressure chambers. A grooved intermediate portion of the body upon movement varies the flow of fluid through said casing ports. Movement of the valve body is controlled by a pilot valve located in a bore of the valve body and having heads for controlling the flow of fluid under pressure from the inlet port of the casing to said pressure chambers through channels 73, 76, 77 in the valve body. Thus the cylindrical extensions of the valve body together with the cylindrical end portions of the casing form servomotor means for hydraulically positioning the valve body using as operating medium some of the fluid, the flow of which is to be controlled. The supply of fluid under pressure to the pressure chambers is controlled by a pilot valve located within a bore of the valve body. Such arrangement is very compact and light in structure and therefore particularly applicable to aircraft operation.

Supported on cover plate 29 in spaced relation thereto by a plurality of spaced studs 82 is a pressure responsive device in the form of a casing 83 comprising two halves between which is fastened a flexible diaphragm 84. Fixed to the central portion of the diaphragm is a pair of metal stiffening disks 85, the central portion of one of which is in the form of a cup 86 over which is fastened a U-shaped yoke 87. Carried by yoke 87 is a piston 88 which moves in and has an air tight fit with a cylinder 89 carried by casing 83. Fixed over cylinder 89 is a double walled protective housing 90, the walls of which are provided with openings which are out of line with each other and which serve to connect the interior of the protective housing to the atmosphere so that the outer end of piston 88 at all times is subjected to the surrounding atmospheric pressure. For transmitting motion from diaphragm 84 to pilot valve 70, there is located between the two a pin 91 which at one end engages the interior of cup 86 and at the other end engages the end of the stem of the pilot valve. Pin 91 is guided in a sleeve 92 suitably attached to a wall of casing 83 and with which it makes an air tight fit.

The other end of the pilot valve stem engages a recess in a head 93 attached to one end of a compression spring 94. Attached to the other end of compression spring 94 is a head 95 which engages the end of an adjustable pin 96 located in the end wall of a spring housing 97 attached to the regulating valve casing and forming a housing for spring 94. By means of pin 96, the tension of spring 94 may be adjusted and fixed in adjustment by set nut 99.

Connected to casing 83 on opposite sides of diaphragm 84 are pipes 100 and 101. These pipes extend through a casing 102 at one side of which is a rotary by-pass valve 103 to the end of which is attached a cam 104. Cam 104 bears against a pin 105 which extends outwardly from the end of a crank arm 105a fixed on one end of a shaft 106 carried in bearings 107, Figs. 3 and 6. On the other end of shaft 106 is a crank arm 108 having a yoke at its outer end which engages collar 81 on the stem of pilot valve 70 (see Fig. 3). Pin 105 is biased into engagement with cam 104 by a coiled spring 109. With this arrangement, when valve 103 is turned, it may effect movement of pilot valve 70 toward the right as viewed in Fig. 6 and closing movement of the regulating valve through the intermediary of shaft 106 and the parts attached thereto. The arrangement of these parts is best shown in Fig. 3 and diagrammatically in Fig. 1.

Valve 103 (see Figs. 1 and 8) comprises a valve casing 110 in which is located a valve member 111 which controls a by-pass between pipes 100 and 101. For the purpose of the diagram, the connection between the pipes 100 and 101 and valve 103 is shown as being in the form of two pipes 112 and 113. Actually, the connection is in the form of passages which extend from casing 102 to the valve casing 103, as shown in dotted lines in Fig. 6. Valve member 111 is carried on a valve stem 114 on one end of which is attached the cam 104. The valve member 111 has a volute surface 115 and a concentric surface 116. It stands in line with conduit 113 and, as shown in Figs. 1 and 8, concentric surface 116 is adapted to cover the end of conduit 113 to cut off communication between it and pipe 112 and it is adapted to be turned to connect conduit 113 to conduit 112 through the space provided by the volute surface 115. As will be seen particularly from Fig. 8, this space varies in radial extent. Assuming that valve head 111 is turned in a clockwise direction as viewed in Fig. 8, first the end of conduit 113 is gradually uncovered by concentric surface 116, after which it is connected to conduit 112 by a narrower portion of the space defined by volute surface 115. Then, as valve head 111 continues to turn, the space connecting the conduits gradually becomes wider. By this arrangement, valve 103 functions to by-pass or short-circuit diaphragm 84 by varying amounts. Valve member 111 may be turned in any suitable way. In the present instance, it is shown as being operated by a reversing electric motor 117 through the intermediary of a gearing 118. In Fig. 3, the motor and gearing are shown as being enclosed in a common casing. The gearing may be of any suitable type which will give the necessary speed reduction. Motor 117 (see Fig. 1) is controlled by a manually operated switch arm 119 adapted to be moved into engagement with contact 120 or contact 121 or to be set permanently into engagement with a contact 122 connected in the motor circuit in parallel with contact 121. Switch arm 119 is biased to an intermediate open switch position by a spring 123. In the motor circuits are limit switches 124 and 125 adapted to be operated by an arm 126 on valve shaft 114. These limit switches serve to limit the extent of movement of valve member 111 in each direction, the total movement in the operation of the system being somewhat less than 300 degrees, in the present instance.

Pipes 100 and 101 connect with a device 2a in discharge conduit 2 which creates a pressure difference which is proportional to the rate of flow of air through the conduit. In the present instance, a pressure difference creating device in the form of a double venturi is shown, pipe 101 being connected to the throat 2b of the venturi and pipe 100 being connected to the high pressure side 2c of the venturi. Thus, diaphragm 84 is subjected to a pressure difference which bears a definite relation to the rate of flow of air through conduit 2, the higher pressure being on the left-hand side of diaphragm 84, as shown in Fig. 1, and acting in a direction to tend to move the regulating valve 49 toward closed position.

The purpose of valve 103 is to vary the percentage of the pressure difference created by double venturi 2a which is applied to diaphragm 84. When valve member 111 covers the end of conduit 113 as shown in Fig. 1, diaphragm 84 is subjected to the total pressure difference. As valve member 111 is turned to first gradually uncover the end of conduit 113 and then to increase the area of the space directly over the end of conduit 113, the area of the passage connecting conduit 113 to conduit 112 is gradually increased to reduce the pressure difference across these conduits and therefore across the control diaphragm.

The forces on pilot valve 70 are composed of the following components: the net outward force of biasing piston 88, due to the fact that its outer surface is exposed to atmospheric pressure and its inner surface is exposed to a higher pressure which is substantially equal to that in the airplane cabin; the inward force of plunger 91, due to the fact that its inner end is exposed to airplane cabin pressure and its outer end is exposed to atmospheric pressure; the outward force of spring 94; and the inward force of diaphragm 84, due to the differential pressure created by the pressure difference creating device 2a. These forces are always in balance. By an inward force I mean a force acting toward the supercharger, i. e. toward the right in Figs. 1 and 6, and by an outward force I mean a force acting in the opposite direction.

Referring now particularly to Fig. 7, the fluid coupling comprises an impeller 130 fixed on a hollow shaft 131 and a runner 132 fixed on a hollow shaft 133. Shafts 131 and 133 are mounted in suitable bearings 134 and 135. Oil is supplied to the impeller half of the coupling through a pair of opposed orifices 136 (see Fig. 7a) which connect the interior of shaft 131 with the spaces between the blades of impeller 130. The outer end of shaft 131 is provided with a hardened steel sleeve 137 which runs against a spring pressed flange 138 carried in a head 139 attached to casing 29. Oil from pipe 50 is supplied to the interior of shaft 131 through passages 140 and 141, which passages connected with pipe 50. In the runner half of the coupling are slots 142 and in the shield 143 which forms a part of the impeller are orifices 143a for the escape of oil from the coupling.

To protect the coupling from excessive speed, there is provided a speed governor 144 of the centrifugal weight type having a stem 146 on the inner end of which is a head 146b which slides in a sleeve or bushing 145 fixed to shaft 131. In sleeve 145 are orifices 146a in alignment with orifices 136. The governor spring is indicated at 147 and it may be set by means of the adjustable nut 148 for the desired speed as is well understood with governors of this type. The governor spring is set so that for all normal speeds, the governor weights are stationary. In case the speed exceeds a predetermined high value, the governor weights move outwardly to effect movement of the governor stem 146 and head 146b to close gradually ports 146a, thus shutting off the supply of oil to the fluid coupling. When this occurs, the oil in the coupling flows out through slots 142 and orifices 143a, thus effecting a decrease in the speed at which impeller 130 drives runner 132. In the outer surface of sleeve 145 are grooves 145a for the passage of oil for lubricating the sleeve bearings which are located in shaft 133.

The fluid coupling illustrated is of known construction, the details of which form no part of my present invention. In operation, when the impeller half of the coupling is being rotated by the engine crankshaft and fluid (oil in the present instance) is supplied thereto, the fluid is discharged to the runner half, effecting turning movement thereof, the speed relative to that of the impeller half depending upon the amount of fluid in the coupling. Thus by regulating the rate of flow of fluid to the coupling, the rate of rotation of the runner can be regulated from a minimum speed when the supercharger is declutched to a speed equal substantially to that of the impeller when maximum fluid is being supplied. The function of regulating valve 49 is to vary the rate of flow of oil to the fluid coupling thus to regulate the speed at which the fluid coupling drives the centrifugal compressor or supercharger.

Spring coupling 41 which connects shaft 42 to shaft 33 is utilized to reduce the amplitude of torsional vibration so as to protect the rotating parts in the gear case from high torque impulses. To this end, the spring coupling is so designed that the natural torsional frequency of the rotating parts is substantially below the minimum input vibration frequency from the engine accessory drive shaft. The coupling comprises two parts, an outer or housing part 150 connected to shaft 42 and an inner part 151 connected to shaft 33. The outer part 150 is provided with spaced inwardly extending flat projections or webs 152 (see Figs. 4 and 5) which are located in circumferentially extending slots formed in triangular-shaped heads 153 which form parts of inner member 151. Located between the successive webs and heads are springs 154 in the ends of which are spring plugs 155 which engage the ends of the webs 152 and heads 153. In the present instance, three webs 152 and heads 153 and three springs 154 are shown. The springs are arranged to be stressed in succession as the torque transmitted by the coupling is increased.

When the air flow from a centrifugal compressor decreases below a certain minimum value unstable operation and pulsations may occur. There is a minimum stable flow for any given impeller speed. To prevent pulsations, I provide in connection with flap valve 6, a surge relief valve 161 which controls an opening 162 in conduit 2 which communicates with the atmosphere and which is connected by linkage 163 to flap valve 6. The arrangement is such that when flap valve 6 is open, relief valve 161 is closed as shown in full lines in Fig. 1 and when flap valve 6 is closed, relief valve 161 is open as shown in dotted lines in Fig. 1. As an illustration of the operation, the case of several cabin superchargers operating in parallel to supercharge a cabin may be taken. Should an engine driving one of the superchargers be impaired or slowed down for any reason, it may become impossible for such supercharger to maintain the pressure difference between the cabin pressure and the atmosphere maintained by the other supercharger operating in parallel with it. When this occurs flow through conduit 2 will decrease to a point where flap valve 6 starts to close. When flap valve 6 starts to close, relief valve 161 starts to open whereupon the subsequent drop in pressure in conduit 2 will permit valve 6 to close completely thus opening wide valve 161. As a result, flow of air through the compressor will increase since conduit 2 is now connected through opening 162 to a region of lower pressure thus preventing pulsation and unstable operation of the compressor. Surge relief valve opening 162 is sufficiently small so that when the supercharger again is brought up to speed the pressure drop through it will be sufficient to cause a pressure to be built up in conduit 2 somewhat greater than the cabin pressure whereupon valve 6 will again be opened and valve 161 closed.

The operation is as follows:

Assume that the airplane is on the ground and that the engine is running, thus driving pumps 35 and 36 and the impeller half of the fluid coupling. In the position of the parts shown in Fig. 1, by-pass valve 111 is in a position such that crank arm 108 is out of engagement with collar 81 and stands out of its path of movement, and the end of conduit 113 is just covered by the right-hand portion of concentric surface of 116. This setting of by-pass valve 111 may correspond to the minimum air flow at which it is desired normally to operate the supercharger, for example, 16 pounds of air per minute, and such minimum air flow will be maintained automatically by diaphragm 84 which will adjust regulating valve 49 to permit sufficient oil to flow past it to the fluid coupling to effect operation of the supercharger at the speed required to maintain such air flow. If the air flow through conduit 2 decreases, the pressure difference applied to diaphragm 84 from pressure difference creating device 2a decreases, effecting a movement of pilot valve 70 toward the left to cause an opening movement of regulating valve 67 to admit more oil to the fluid coupling, thus increasing its speed and bringing the flow of air back to that for which the by-pass valve 111 is set. If the flow of air tends to increase then a similar operation takes place except in the opposite direction, the regulating valve 67 being moved toward closed position to decrease the flow of oil past it to the fluid coupling, thus decreasing the speed of the supercharger. The air discharged through conduit 2 flows past valve 6 to the cabin.

If, with the parts as shown in Fig. 1, switch arm 119 is moved into engagement with either contact 121 or contact 122, motor 117 will be operated to effect movement of valve member 111 in an anti-clockwise direction as viewed from the left-hand end in Fig. 1, whereby cam 104 turns crank arm 105a, shaft 106 and crank arm 108 to bring crank arm 108 into engagement with collar 81 and effect movement of regulating valve body 69 to its extreme right-hand position wherein piston 68 engages the end of cylinder 66. In this position of the parts, which may be termed the declutching position, the fluid coupling is operated at maximum slip. The supercharger then will be turning due to the drag of the fluid coupling but at a speed such that little, if any, air will be flowing. The arrangement is such that in this position of the regulating valve a small flow of oil takes place past it for lubricating purposes. This result may be effected either by arranging the regulating valve so that in its extreme right-hand position it is not quite closed, or by providing a by-pass around the valve as shown at 160 in Fig. 9.

The regulating value is held positively in its declutching position against the action of spring 94 by crank arm 108 which in turn is positively positioned by motor 117. It may be moved gradually away from declutching position and held positively in successive positions by operating motor 117 to effect successive movements of crank arm 108 toward the left in Fig. 1, the pilot valve following movements of arm 108 due to the action of spring 94. Thus the speed of the supercharger may be gradually increased from the drag speed at which it operates when the regulating valve is in declutching position through a series of speeds until crank arm 108 moves out of contact with collar 81, whereupon diaphragm 84 will assume control. In other words, there is a range of speed through which the supercharger may be operated by positively positioning the regulating valve by means of crank arm 108. This enables the operator to run the supercharger through a range of lower speeds below that which may be termed the minimum normal operating speed.

Ordinarily in airplane operation, supercharging of the cabin, i. e., supplying air to the cabin at a pressure higher than the surrounding atmospheric pressure, is not started until an airplane has reached a certain height, for example 8000 feet. However, at altitudes lower than this the supercharger may be used to supply the needed air for ventilating the cabin.

Assuming the parts are in the position shown in Fig. 1, and the operator desires to prepare for flight; he may leave by-pass valve member 111 set for minimum supercharging air flow as shown, or he may move switch arm 119 in engagement with contact 120 to effect operation of motor 117 in a direction to set by-pass valve member 111 for a greater air flow, for example 20 pounds or 22 pounds per minute. If, for example, by-pass valve 111 is moved from the position shown in Fig. 1 to the position corresponding to twenty pounds of air per minute, then diaphragm 84 will be moved toward the left in Fig. 1 due to the decrease in the differential pressure applied to it caused by the new setting of by-pass valve member 111, thus moving pilot valve 70 toward the left to effect an opening movement of regulating valve body 69 and the supplying of more oil to the fluid coupling to increase the speed of the supercharger so it will deliver the desired increased weight flow of air. Each position of by-pass valve member 111 corresponds to a different rate of air flow. The operator may set valve member 111 for the desired air flow.

The airplane is now ready for flight and as it leaves the ground and gains altitude the control will function automatically to maintain the rate of flow for which by-pass valve member 111 is set. As the density of the air decreases, the speed of the supercharger will be increased automatically to maintain such rate of flow. If the flow of air through conduit 2 decreases, the pressure difference applied to diaphragm 84 decreases, effecting an opening movement of regulating valve 49 in the manner already described to increase the flow of oil to the fluid coupling and thus increase the speed of the supercharger. If the flow of air through conduit 2 increases, the pressure difference applied to diaphragm 84 will increase, effecting a closing movement of regulating valve 49 to decrease the flow of oil to the fluid coupling and thus decrease the speed of the supercharger.

The cabin may be open to atmosphere until the altitude is reached at which it is desired to begin supercharging. At this altitude the cabin is sealed after which the pressure in the cabin will be that for which the automatic discharge valve comprising bellows 11 is set. By-pass valve member 111 may be set initially while the airplane is on the ground for the air flow which it is desired to maintain at flying altitude or it may be set for other desired flow value and the flow then adjusted by the operator as the airplane gains altitude.

The pressure difference creating device 2a measures primarily volume of air flow. However, it is desired to supply to the cabin a constant weight flow of air. A function of piston 88 is to effect this result.

The outer end of piston 88 is exposed to atmospheric pressure, the pressure on it acting in opposition to spring 94. Its exposed area is chosen to compensate automatically for changes in the weight of air delivered by the supercharger due to the increase in temperature of the air flowing through the venturi 2a (and therefore increased Venturi suction for constant weight flow of air) as the aircraft ascends and as the compression ratio across the supercharger increases; for the reduction in the force of spring 94 as the aircraft ascends and the oil regulating valve moves to the left as shown in Fig. 1; and for the end thrust of plunger rod 91 due to the fact that its right-hand end is exposed to atmospheric pressure whereas the end inserted in diaphragm 84 is exposed to cabin pressure. This is an important feature of my invention since by such arrangement I am enabled to supply to the cabin substantially a constant weight flow of air.

If at any time the operator desires to shut down the supercharger he has only to move switch arm 119 into engagement with contact 122 and leave it there whereupon motor 117 will be operated to cause cam 104 to turn shaft 106 in a direction to bring crank arm 108 into engagement with collar 81 thus moving pilot valve 78 to the right in Fig. 1 against the action of spring 94 to effect closing of regulating valve 49, thus declutching the supercharger, the motor being stopped by the opening of limit switch 124. Operation of motor 117 in the other direction is limited by limit switch 125.

In some instances an airplane may be equipped with two or more cabin superchargers all of which may be operating in parallel when the airplane is at flying altitude. When each supercharger is equipped with a control embodying my invention, one or more may be easily and quickly declutched after the manner described when the airplane is descending or is operating at a lower altitude, others being kept in operation for supercharging or ventilating purposes.

If at any time the automatic control becomes disabled, for example by failure of diaphragm 84, the operator, by means of his manual control, can set crank arm 108 to position the regulating valve 49 to give a desired air flow.

In accordance with the provisions of the patent statutes, I have described the principle of operation of my invention, together with the apparatus which I now consider to represent the best embodiment thereof, but I desire to have it understood that the apparatus shown in only illustrative and that the invention may be carried out by other means.

What I claim as new and desire to secure by Letters Patent of the United States, is:

1. In combination, an aircraft cabin compressor, variable speed driving means for the compressor, regulating means for said driving means including a movable member, and means for positioning said movable member comprising a device responsive to the rate of flow of fluid discharged from the compressor to increase the speed of the driving means upon decreasing rate of flow and means responsive to variations of atmospheric pressure to increase said speed upon decreasing atmospheric pressure.

2. In combination, a compressor, driving means for the compressor including a variable speed fluid coupling, means including a regulating valve for regulating the flow of fluid to the fluid coupling, means including a movable abutment for positioning said regulating valve, and means responsive to changes of rate of flow of fluid discharged from said compressor and to atmospheric pressure changes for positioning said movable abutment to effect increased flow of fluid to the coupling with decreasing rate of flow of fluid from the compressor and decreasing atmospheric pressure.

3. In a control system for an aircraft cabin supercharger, the combination of a supercharger, a conduit connecting the discharge side of the supercharger to the cabin, a pressure-difference-creating device for creating a pressure difference which bears a definite relation to the rate of flow in said conduit, speed regulating means including a movable abutment for the supercharger, conduits connecting the pressure-difference-creating device to said movable abutment, and a member responsive to atmospheric pressure acting on said abutment.

4. In a control system for an aircraft cabin supercharger, the combination of a supercharger, a conduit connecting the discharge side of the supercharger to the cabin, a pressure-difference-creating device for creating a pressure difference which bears a definite relation to the rate of flow in said conduit, speed regulating means including a movable abutment for the supercharger, conduits connecting the pressure-difference-creating device to said movable abutment, a member responsive to atmospheric pressure acting on said abutment, and means for varying the amount of created pressure difference applied to said movable abutment.

5. In a control system for an aircraft cabin supercharger, the combination of a supercharger, a conduit connecting the discharge side of the supercharger to the cabin, a pressure-difference-creating device for creating a pressure difference which bears a definite relation to the rate of flow in said conduit, speed regulating means including a movable abutment for the supercharger, conduits connecting the pressure-difference-creating device to said movable abutment, and means acting on said abutment for compensating for variations in density of the air discharged by the supercharger.

6. In a control system for an aircraft cabin supercharger, the combination of a supercharger, a conduit connecting the discharge side of the supercharger to the cabin, a pressure-difference-creating device in said conduit for creating a pressure difference which bears a definite relation to the rate of flow, speed regulating means for the supercharger, movable means responsive to the created pressure difference for positioning said speed regulating means, and means for modifying said regulating means to compensate for variations in the weight of air delivered by the compressor due to changes in density of the air.

7. In a control system for an aircraft cabin supercharger, the combination of a supercharger, a conduit connecting the discharge side of the supercharger to the cabin, a pressure-difference-creating device in said conduit for creating a pressure difference which bears a definite relation to the rate of flow, speed regulating means for the supercharger including a movable abutment and a spring in opposed relation to each other, conduits connecting the pressure-difference-creating device to said abutment, and means subjected to atmospheric pressure to compensate for variations in the force of said spring.

8. In a control system for an aircraft cabin supercharger, the combination of a supercharger, a conduit connecting the discharge side of the supercharger to the cabin, a pressure-difference-creating device in said conduit for creating a pressure difference which bears a definite relation to the rate of flow, speed regulating means for the supercharger including a movable abutment and a spring in opposed relation to each other, conduits connecting the pressure-difference-creating device to said abutment, and means acting on said abutment and spring to compensate for variations in the weight flow of air delivered by the compressor due to changes in air density and variations in the force of said spring.

9. In a control system for an aircraft cabin supercharger, the combination of a supercharger, a conduit connecting the discharge side of the supercharger to the cabin, a pressure-difference-creating device in said conduit for creating a pressure difference which bears a definite relation to the rate of flow, speed regulating means for the supercharger including a movable abutment and a spring in opposed relation to each other, conduits connecting the pressure-difference-creating device to said abutment, and a member connected to the abutment and subjected to atmospheric pressure to compensate for variations in the weight flow of air delivered by the compressor due to changes in air density.

10. In a control system for an aircraft cabin supercharger, the combination of a supercharger, a conduit connecting the discharge side of the supercharger to the cabin, a pressure-difference-creating device in said conduit for creating a pressure difference which bears a definite relation to the rate of flow, speed regulating means for the supercharger including a movable abutment and a spring in opposed relation to each other, conduits connecting the pressure-difference-creating device to the abutment, and a member connected to the abutment and subjected to atmospheric pressure to compensate for variations in the force of said spring.

11. In a control system for an aircraft cabin supercharger, the combination of a supercharger, a conduit connecting the discharge side of the supercharger to the cabin, a pressure-difference-creating device in said conduit for creating a pressure difference which bears a definite relation to the rate of flow, speed regulating means for the supercharger including a movable abutment and a spring in opposed relation to each other, conduits connecting the pressure-difference-creating device to said abutment, and a member connected to the abutment and subjected to atmospheric pressure to compensate for variations in the weight flow of air delivered by the compressor due to changes in air density and for variations in the force of said spring.

12. In a control system for an aircraft cabin supercharger, the combination of a supercharger, a conduit through which air is supplied by the supercharger to the cabin, regulating means for the supercharger including a movable abutment and a spring in opposed relation to each other, means responsive to a condition of the air supplied to the cabin by said supercharger for positioning said abutment, and means responsive to altitude pressure for modifying the action of said abutment and spring.

13. In a control system for an aircraft cabin supercharger, the combination of a supercharger, a discharge conduit connecting it to the cabin, driving means for the supercharger including a motor and a variable speed means for connecting the motor to the supercharger, regulating means for said variable speed means, and means responsive to changes of the rate of flow of air supplied by the supercharger to the cabin and to changes of atmospheric pressure for controlling said regulating means to increase the speed of the driving means in response to decreasing rate of flow of air from the supercharger and in response to decreasing atmospheric pressure.

14. In an aircraft supercharger system, a supercharger comprising a centrifugal compressor having a discharge conduit, means for driving the supercharger, valve means for shutting off said conduit when the flow through it reaches a low value, a surge relief valve connected with said conduit, and means linking the surge relief valve to the valve means to effect opening of the surge valve when said valve means is closed.

15. In a cabin supercharger, a centrifugal compressor, a conduit connecting the discharge side of the compressor to the cabin, valve means for shutting off the flow of air from the compressor to the cabin when the flow reaches a low value, and a surge relief valve means linked to said valve means for automatically connecting the discharge conduit to atmosphere when said first-named valve means closes.

16. In a cabin supercharger, a centrifugal compressor, a conduit connecting the discharge side of the compressor to the cabin, a spring biased butterfly valve normally held open against the spring action by flow of air through said conduit to the cabin and closed by spring action when the flow reaches a certain low value, and a surge relief valve connected with a moving part of said first named valve to automatically open when said first named valve is closed to connect the discharge conduit directly to atmosphere.

17. In a cabin supercharger, a centrifugal compressor, a conduit connecting the discharge side of the compressor to the cabin, a valve responsive to flow of air through said conduit to the cabin which closes when the flow reaches a certain low value, and a surge relief valve mechanically linked to a moving part of said first named valve which is automatically opened when the first named valve is closed to connect said conduit directly to atmosphere, said surge relief valve being of small area compared with the area of the first named valve whereby upon increase in flow pressure will be built up to open the first named valve and close the surge relief valve.

18. For use in a system of the character described, a regulating structure comprising a valve casing having a valve seat and a cylinder on each side of the seat, a valve body having a portion which cooperates with said seat and pistons located in said cylinder, said valve body having a central bore, a pilot valve located in said bore, said valve body being provided with passages controlled by the pilot valve which connect the bore to said cylinders, and a movable abutment, a piston exposed to atmospheric pressure and a spring acting on said pilot valve.

19. In combination, a drive shaft, a supercharger, means including a fluid coupling connecting the drive shaft to the supercharger, means for regulating the supply of fluid to the fluid coupling, and an overspeed governor driven by the supercharger for cutting off the supply of fluid to the coupling in case the supercharger speed exceeds a predetermined high value.

20. In combination, a supercharger, means including a fluid coupling for driving the supercharger, valve means for regulating the supply of fluid to said coupling, means responsive to an operating condition of the supercharger for positioning said valve means, and an overspeed governor driven by the supercharger for cutting off the supply of fluid to the coupling in case the supercharger speed exceeds a predetermined high value.

21. In combination, a supercharger, means including a fluid coupling for driving the supercharger, said coupling having a hollow shaft through which fluid is supplied thereto, a valve member in said hollow shaft for cutting off the flow of fluid therethrough to the coupling, and an overspeed governor responsive to the speed of the supercharger for positioning said valve member.

22. In combination, a supercharger, means including a fluid coupling having an impeller and a runner for driving the supercharger, automatic means for regulating the supply of fluid to the fluid coupling, and an overspeed governor driven by the runner for cutting off the supply of fluid to the coupling in case the speed of the supercharger exceeds a predetermined high value.

23. In a control system for an aircraft cabin supercharger, the combination of a supercharger, a conduit connecting the discharge side of the supercharger to the cabin, a device for creating a pressure difference which bears a definite relationship to the rate of flow in said conduit, means including a movable abutment for controlling the supercharger, conduits connecting the pressure difference creating device to said movable abutment, and means acting on said abutment for compensating for variations in atmospheric pressure.

WILFRID E. JOHNSON.

REFERENCES CITED

The following references are of record in the file of this patent:

UNITED STATES PATENTS

| Number | Name | Date |
|---|---|---|
| 1,456,090 | Bennett | May 22, 1923 |
| 1,562,663 | Strong | Nov. 24, 1925 |
| 1,655,683 | Standerwick | Jan. 10, 1928 |
| 1,792,665 | Torre | Feb. 17, 1931 |
| 1,795,190 | Weir | Mar. 3, 1931 |
| 1,910,202 | Crago | May 23, 1933 |
| 2,002,057 | Gregg | May 21, 1935 |
| 2,151,075 | Berger | Mar. 21, 1939 |
| 2,208,554 | Price | July 16, 1940 |
| 2,217,364 | Halford et al. | Oct. 8, 1940 |
| 2,228,239 | Ammann | Jan. 14, 1941 |
| 2,276,371 | Cooper et al. | May 17, 1942 |
| 2,284,984 | Nixon et al. | June 2, 1942 |

FOREIGN PATENTS

| Number | Country | Date |
|---|---|---|
| 14,206 | Great Britain | 1913 |
| 214,954 | Great Britain | Sept. 4, 1924 |
| 369,612 | Italy | Mar. 25, 1939 |
| 378,754 | Great Britain | Aug. 18, 1932 |
| 493,962 | France | Dec. 17, 1918 |
| 834,704 | France | Mar. 3, 1938 |